(12) United States Patent
Potin et al.

(10) Patent No.: US 6,342,872 B1
(45) Date of Patent: Jan. 29, 2002

(54) HELMET WITH NIGHT VISION SYSTEM AND OPTIC CAPABLE OF BEING SUBSTITUTED FOR DAY VISION

(75) Inventors: Laurent Potin, Bordeaux; Joël Baudou, St Medard en Jalles, both of (FR)

(73) Assignee: Sextant Avionique, Velizy Villacoublay (FR)

( * ) Notice: Subject to any disclaimer, the term of this patent is extended or adjusted under 35 U.S.C. 154(b) by 0 days.

(21) Appl. No.: 09/284,462
(22) PCT Filed: Nov. 7, 1997
(86) PCT No.: PCT/FR97/02011
  § 371 Date: Apr. 19, 1999
  § 102(e) Date: Apr. 19, 1999
(87) PCT Pub. No.: WO98/21618
  PCT Pub. Date: May 22, 1998

(30) Foreign Application Priority Data

Nov. 12, 1996 (FR) ............................................. 9613741

(51) Int. Cl.⁷ ................................................. G09G 5/00
(52) U.S. Cl. .................................... 345/8; 345/7; 345/9
(58) Field of Search ..................... 345/9, 8, 7

(56) References Cited

U.S. PATENT DOCUMENTS

| | | | | |
|---|---|---|---|---|
| 4,969,714 A | * | 11/1990 | Fourier, Jr. et al. | 345/9 |
| 5,229,598 A | * | 7/1993 | Filipovich | 345/9 |
| 5,353,054 A | * | 10/1994 | Geiger | 348/31 |

* cited by examiner

Primary Examiner—Richard Hjerpe
Assistant Examiner—Duc Q Dinh
(74) Attorney, Agent, or Firm—Oblon, Spivak, McClelland, Maier & Neustadt, P.C.

(57) ABSTRACT

A helmet with night vision system. The system includes an image generator, an optical mixing system for mixing the light rays output by the night vision system and the light rays output by the image generator and a fixed optical system downstream of the optical mixing system. All of the night vision system and the optical mixing system can be removed and a substitute optical system can be inserted for daytime vision. The substitute optical system has the same optical characteristics as the optical mixing system, but has a transmission coefficient higher than that of the optical mixing system. The substitute system is optimized for day vision while the mixing system is optimized for night vision. The helmet may be used for pilots of combat helicopters or airplanes.

14 Claims, 3 Drawing Sheets

HELMET WITH NIGHT VISION SYSTEM AND OPTIC CAPABLE OF BEING SUBSTITUTED FOR DAY VISION

BACKGROUND OF THE INVENTION

1. Field of the invention

The present invention relates to a display system, optimized for night vision and for day vision, for the helmet of a vehicle driver or pilot. It applies in particular to the helmets of pilots of combat helicopters or military aircraft.

2. Discussion of the Background

A helmet display system is a device for displaying the information superimposed on the view of the landscape.

Presenting the pilot or driver with appropriate information, for example in the form of symbols, makes it possible to aid driving or piloting, and navigation. In particular for combat vehicles, a reticule provides an aid for aiming a weapon.

Inside the helmet, a symbol generator comprises a cathode-ray tube on whose screen an image of the symbols is formed. The helmet also comprises an optical relay system for conveying this image to a combiner which presents the conveyed image superimposed on the view of the landscape.

The combiner is generally formed by a part of the visor which has been surface-treated to reflect an image to the eye of the driver or pilot while allowing him to observe the landscape by day through the visor.

In order to permit night vision as well, helmet display systems comprise an integrated light intensifier. The image of the night-time scene is received by an objective lens and is then intensified by the light intensifier.

The light intensifier comprises a photocathode at its input and a cathode-ray screen at its output. The photons received on the objective lens are converted into electrons by the photocathode. The light intensifier accelerates and multiplies these electrons so as to finally form an intensified image on its cathode-ray screen.

The intensified image of the landscape, on the one hand, and the image of the symbols, on the other hand, are mixed by a mixer to form a single image which is conveyed to the combiner. The combiner reflects this image and superimposes it on the very dark night-time scene.

However, the state of the art as regards a light intensifier which can be integrated with a helmet leads to a low luminosity for the intensified image. The mixer thus favours the intensified image over the image from the symbol generator, so that the pilot or driver sees an intensified image of the landscape without being dazzled by the superimposed symbols which are too bright.

The mixer is typically such that the luminosity of the mixed image is made up of 75% of the luminosity of the intensified image and 25% of that of the symbol image.

For day vision with a helmet having a display system with integrated light intensifier, the driver or pilot turns the intensifier off. An intensified image is not formed, and the mixer transmits only the symbol image; this image is conveyed to the combiner and allows the driver or pilot to see the symbols superimposed on the daytime landscape. The objective lens and the light intensifier are then superfluous.

Thus, during a day mission, a helmet with a display system having an integrated light intensifier makes the driver or pilot have to wear elements on his head which are heavy and bulky while fulfilling no purpose.

Furthermore, the mixer attenuates the image from the symbol generator by transmitting about a quarter of its luminosity, and this attenuated image is superimposed by the combiner on the view of the very bright daytime landscape. The luminosity of the symbols is insufficient in comparison with that of the landscape, and the driver or pilot does not see these symbols clearly during day missions.

These two drawbacks are found to be very serious for known helmet display systems which provide for day vision and night vision.

SUMMARY OF THE INVENTION

The object of the invention is for the driver or pilot to see the superimposed symbols clearly both in day vision and in night vision.

To this end, the invention relates to a helmet comprising a night vision system, an image generator, an optical mixing system for mixing the light rays output by the night vision system and the light rays output by the image generator, and a fixed optical system downstream of the optical mixing system, characterized in that it includes:

- a first optical mixing system having a first transmission coefficient for the rays output by the image generator,
- a substitute optical system having the same optical characteristics as the optical mixing system for the rays output by the image generator, but with a second transmission coefficient which is greater than the first,
- and a housing upstream of the fixed optical system, for accommodating either the optical mixing system or the substitute optical system in such a way that they can be removed.

A helmet according to the invention has a modular architecture with a night module, comprising the optical mixing system and the night vision system, and a day module comprising the substitute optical system.

The night module is optimized for night missions, while the day module is optimized for day missions.

The driver or pilot changes the module himself according to his requirements in terms of a display device, depending on the type of mission and depending on the ambient lighting conditions during the mission.

In night vision with the night module and the night vision system turned on, the driver or pilot sees symbols superimposed on the intensified image of the landscape which is provided by the light intensifier of the night vision system. The luminosity of these symbols, and that of the intensified image, are compatible with comfortable viewing on the part of the driver or pilot.

In day vision, the driver or pilot removes the night module then places the day module in the location thus freed. The latter module ensures that symbols superimposed on a very bright landscape can be seen clearly.

Furthermore, the day module is much less encumbering for the head of the driver or pilot than the assembly comprising the optical mixing system and the night vision system. This decrease in weight allows a substantial reduction in the discomfort and fatigue suffered by the wearer of the helmet during day missions.

The replacement of one module by the other is carried out by the driver or pilot himself when he is wearing the helmet, by manual extraction of the module in place and straightforward insertion of the other module. Adjustment is automatic.

The replacement takes little time and can be done in flight because the direct view of the landscape through the combiner is maintained when there is no module inserted in the housing.

For binocular vision, the helmet has two complete sets of equipment, one for the right eye and the other for the left eye; i.e. two night modules and two day modules.

BRIEF DESCRIPTION OF THE DRAWINGS

The invention will be understood more clearly with the aid of the description which is given with reference to the appended figures, in which.

DETAILED DESCRIPTION OF THE PREFERRED EMBODIMENT

Figure 1:
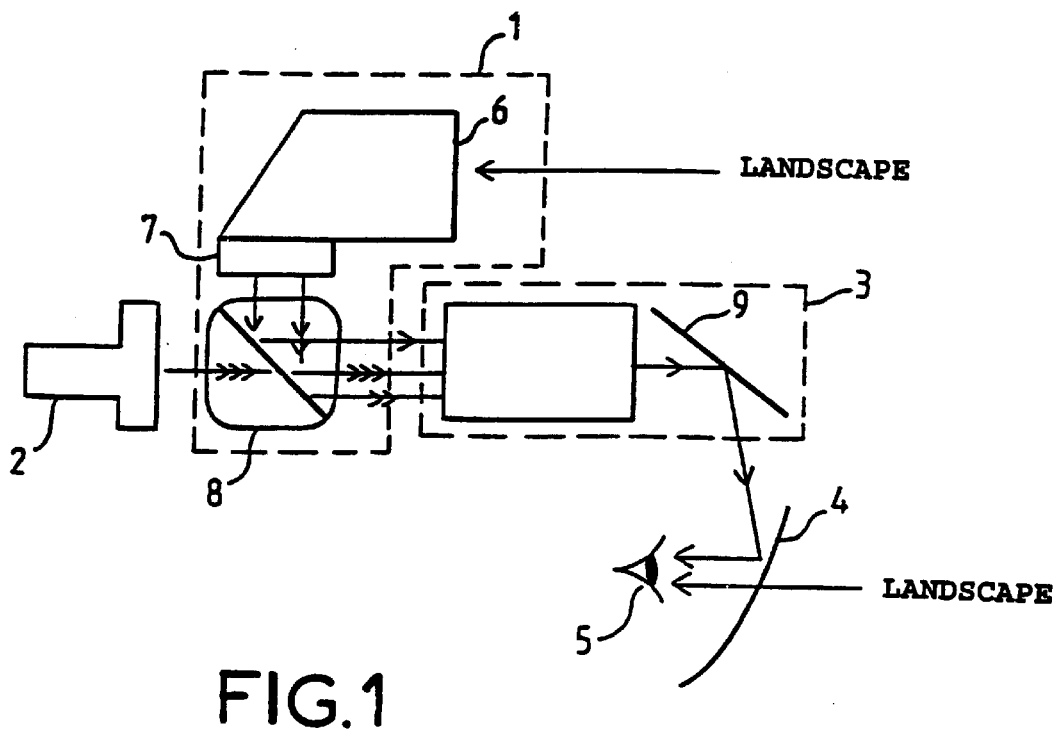
FIG. 1 presents a diagram of the helmet display system according to the invention for night vision.

For night vision, a helmet according to the invention comprises a display system whose diagram is presented in FIG. 1. This display system is equipped with a night module 1 inserted between an image generator 2 and a fixed optical system 3.

The image generator 2 is, for example, a symbol generator.

The image obtained at the output of the night module is conveyed by the fixed optical system 3 to a combiner 4 which reflects this image to the eye S of the driver or pilot. The driver or pilot sees this image superimposed on the view which his eye naturally gives him of the night-time landscape.

The night module 1 comprises an objective lens 6 and an image intensifier 7 which, when the intensifier is turned on, cooperate to produce an intensified image of a part of the night-time landscape; this part of the landscape is the one which has emitted the photons received by the objective lens 6.

The night module furthermore comprises an optical mixing system 8 which receives the said intensified image, on the one hand, and the image formed by the symbol generator 2, on the other hand.

The optical transport system of this display system comprises the optical mixing system 8 and the fixed optical system 3.

At the output of the optical mixing system 8, a single image, corresponding to the intensified image of the landscape, on which symbols are superimposed, is sent to the input of the fixed optical system 3.

The optical mixing system 8 transmits, for example, 25% of the luminosity of the symbol image and 75% of that of the intensified image.

This optical mixing system 8 favours the intensified image over the symbol image when synthesizing the said single image.

The luminosity of the symbols which are displayed in this way is tailored to the weak luminosity of the intensified image; the view of the landscape together with the symbols is comfortable for the driver or pilot in a night mission.

The fixed optical system 3 may comprise a mirror 9 for folding back the optical path between the output of the optical mixing system 8, on the one hand, and the combiner 4, on the other hand, thus producing a compact device.

Figure 2:
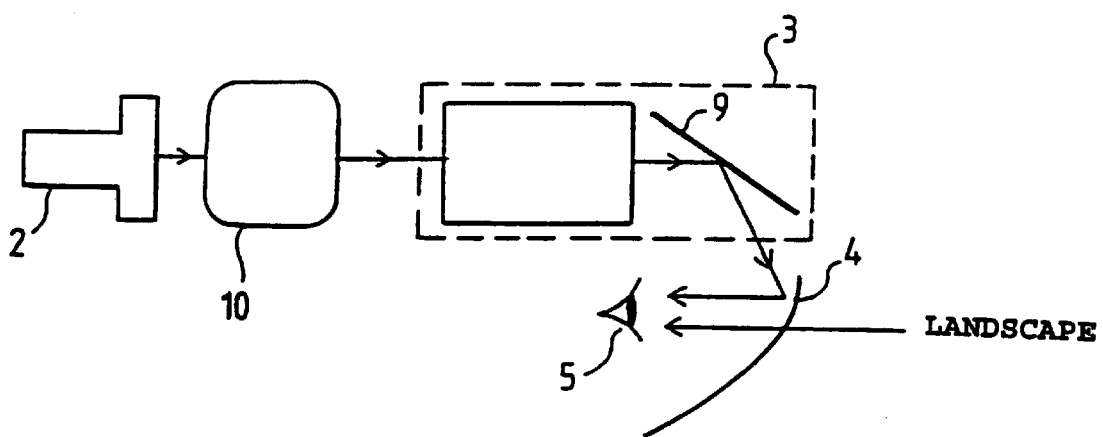
FIG. 2 presents a diagram of the helmet display system according to the invention for day vision.

For day vision, the diagram of a helmet display system according to the invention is presented in FIG. 2. This display system is equipped with a day module 10, inserted between the image generator 2 and the fixed optical system 3, both having been described above with regard to night vision.

The day module 10 receives the image formed by the symbol generator 2 and sends it to the input of the fixed optical system 3.

The optical system of the day module forms part of the optical transport system of the display system.

The optical system of the day module transmits virtually 100% of the luminosity of the symbol image.

The symbol image is not attenuated, which allows clear vision of the symbols superimposed on the very bright daytime landscape.

With the night module, the optical system of the helmet is optimized for night-time vision.

With the day module, the optical system of the helmet is optimized for daytime vision.

The night module 1 of a helmet according to the invention is removable; it can be taken out and replaced by the day module 10. The modules can be installed in the same housing, located between the symbol generator 2 and the fixed optical system 3, this housing not having been represented on the symbolic diagram in FIGS. 1 and 2.

The optical system of the day module 10 is referred to as the substitute optical system. The optical mixing system and the substitute optical system have the same characteristics in terms of geometrical optics, but they differ from the point of view of photometry by having different coefficients for the transmission of luminosity.

In FIGS. 1 and 2, the combiner 4 consists, for example, of a visor forming part of the helmet.

Figure 3:
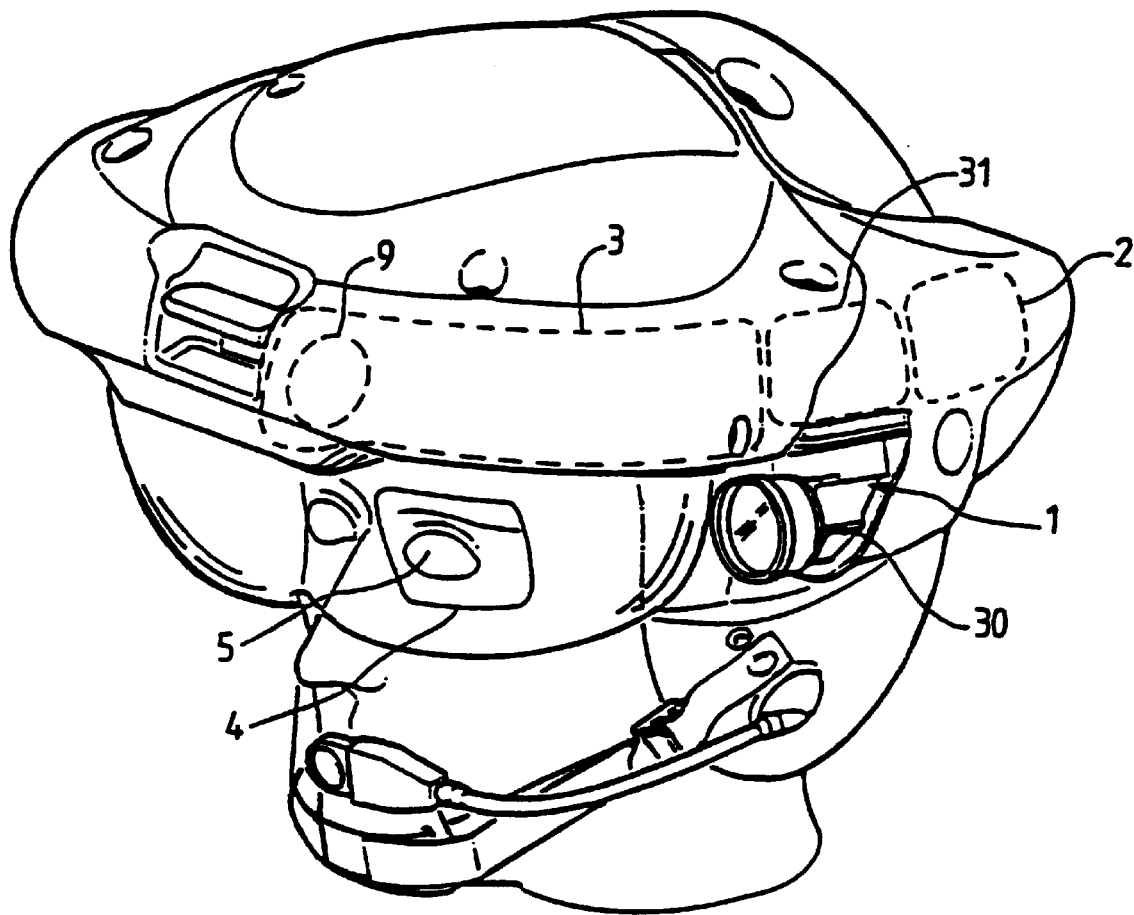
FIG. 3 presents one embodiment of the helmet according to the invention.

In an embodiment of the invention which is represented in FIG. 3, the helmet comprises one display system according to the invention for each eye. FIG. 3 more particularly shows the display system corresponding to the left eye.

For this left-side display system, the screen of the symbol generator 2 is integrated in the helmet in the upper vicinity of the left ear of the driver or pilot, the night module 1 is placed level with the temple and the fixed optical system 3 conveys an image, formed in the vicinity of the temple, to the combiner 4 which is itself formed by a part of the visor of the helmet; the fixed optical system 3 comprises a mirror 9 placed level with the forehead of the driver or pilot. In FIG. 3, the locations of these various elements inside the helmet are represented by broken lines.

The display system corresponding to the right eye is not represented in FIG. 3, but it comprises equivalent elements placed symmetrically with respect to the plane of symmetry of the face of the driver or pilot.

In order to reduce industrial production costs, the elements for the right eye and for the left eye are as far as possible identical.

The following description corresponds to the left-side display system. FIG. 3 shows a protrusion 30, on the night module 1, making it possible for the left hand of the driver or pilot to grip this module. A simple manual pull downwards makes it possible to take out the night module 1 by withdrawing it from the housing 31 located between the generator 2 and the fixed optical system 3.

The housing 31 is equally well adapted for the night module 1 and the day module 10.

The act of fitting a module consists in placing the said module in the lower vicinity of the housing 31 using the left hand, then in pushing the module upwards until it locks in the housing 31.

The left-side module may also be gripped and manipulated using the right hand of the wearer of the helmet.

The modules are easy to put in and take out, and this does not need to be done in the workshop, it being possible for these operations to be performed while driving or piloting the vehicle.

The driver or pilot optimizes the display system of his helmet for the relevant mission by choosing the appropriate module. And the module which is not currently mounted on the helmet may, for example, be carried in a pocket of the clothing of the driver or pilot.

Figure 4:
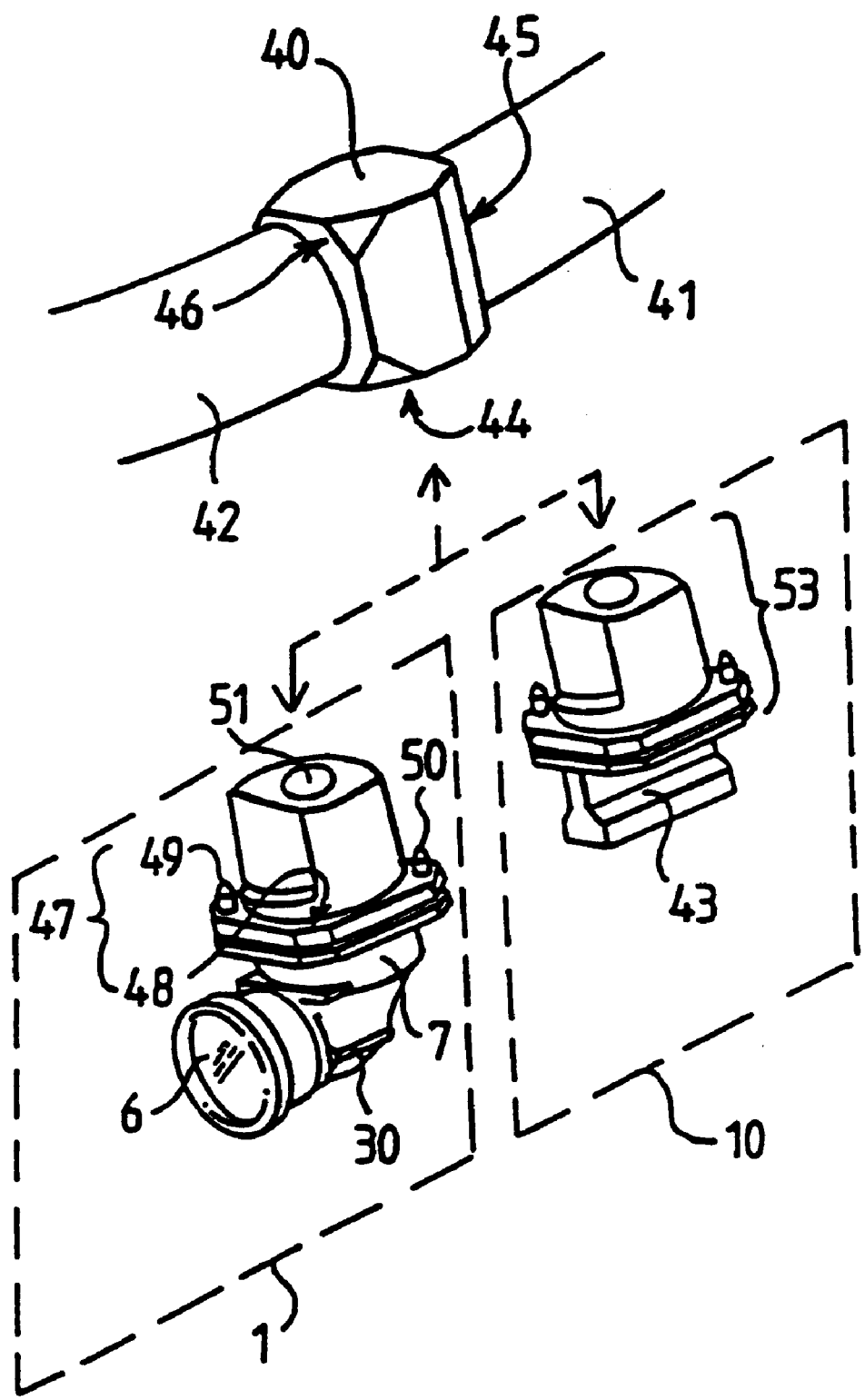
FIG. 4 presents a night module, a day module and the location in which one or other of these modules can be inserted.

In FIG. 4, the housing 31, which has already been described, is represented by the casing 40 placed between a part 42 of the fixed optical system 3 and a part 41 of the symbol generator 2.

The casing 40 may contain either the night module 1 or the day module 10; these two modules are also represented in FIG. 4.

The lower face 44 of the casing 40 is open. When the casing 40 is empty, a module can be inserted in it through its lower face 44.

Through its face 45, which is in common with the said part 41 of the symbol generator, the casing allows the light emitted by the screen of the symbol generator to enter.

The casing 40 lets an image emerge through the face 46 which is in common with the part 42 of the fixed optical system 3.

In FIG. 4, the night module 1 has an objective lens 6 and a light intensifier 7 forming the lower part of the module 1; the optical axes of these two elements are, for example, orthogonal. This lower part of the night module 1 does not penetrate the housing 31 in the casing 40.

This FIG. 4 shows the protrusion 30 for gripping the night module 1, another protrusion, for example substantially symmetrical with respect to the vertical plane passing through the optical axis of the lens 6 cannot be seen, and together these two protrusions make it possible to grip by pinching between the fingers of the driver or pilot, for example with the left index on the protrusion 30 and the left thumb on the said symmetrical protrusion.

The upper part 47 of the night module 1 contains the optical mixing system 8. It is this upper part which can penetrate the housing 31.

The optical mixing system is an element of the optical transport system as a whole, the latter system providing, for the image formed on the screen of the image generator 2, transfer to the combiner 4, on the one hand, and aberration corrections, on the other hand. The positioning of the optical mixing system, like that of any other optical element, is critical.

According to one characteristic of the invention, the upper part 47 of the night module 1 is positioned using a pure translation and a fixed stop, these together ensuring that the optical performance does not vary when the module is changed.

The pure translation is a lengthwise guiding operation which is easy to implement and which ensures a high degree of consistency in the optical performance.

The fixed stop allows initial adjustment of the positioning and makes the optical performance more reliable.

As in FIG. 4., a positioning system of this type is, for example, produced by a surface bearing, a foot and a ball socket.

The boundary between the lower part and the upper part 47 of the module 1 is manifested by a projection having a plane surface 48 which fits the edge, itself also plane, of the lower face 44 of the casing 40; this produces a surface bearing.

The surface 48 furthermore has two feet 49 and 50 which, when inserted into the casing 40, prevents the module 1 from rotating.

Each foot 49 and 50 has, for example, symmetry of revolution with a symmetry axis orthogonal to the plane of the surface 48, a cylindrical part of circular base contiguous with the said surface 48 and a conical end which makes it easier for it to be inserted into a recess in the casing 40.

For each foot of the module, the casing 40 comprises a recess which may consist of a ball socket.

When the module is fitted in the helmet, each foot fits into the opening of the socket via its conical end, then each cylindrical foot part, by co-operating with the balls of the socket, provides lengthwise guidance until the surface bearing is achieved between the plane surface 48 of the module and the edge of the lower face 44 of the casing.

The module may be held in the casing, for example, by the effect of magnetism.

FIG. 4 shows a magnet 51 fixed to the top of the module 1, another magnet 52 fixed to the bottom of the casing 40 cannot be seen, and these two magnets are placed in such a way that, when the module is inserted in the casing, they cooperate to overcome the effect of gravity which naturally acts on this module, and thus to hold the upper part 47 of the module in the casing 40.

These magnets have a non-zero air gap which is adjusted so as to obtain a return force sufficient to ensure stability with respect to vibration, while allowing the driver or pilot to extract the module easily by hand.

These magnets also contribute to ensuring that the casing and the removable element consisting of the module are light-tight.

It would also be possible for the modules to be held by mechanical engagement or a bayonet system.

The night module 1 comprises a light intensifier supplied with electricity from the helmet, for example. In this case, the electrical contacts for supplying the night module 1 are made by pressure. When the module is in place, this makes fitting and removing the module easy.

The day module 10 comprises an optical system which transmits, without attenuation, the light which it receives from the screen of the symbol generator 2 when the day module 10 is inserted in the helmet. This optical system provides the same aberration corrections as the optical mixing system 8.

In FIG. 4, the day module 10 has an appendage 43 allowing the driver or pilot to grip this module. The day module 10 has an upper part 53, containing the substitute optical system and with an external geometry similar to that of the upper part 47 of the night module 1. It is the upper part 53 which penetrates the housing 31 in the casing 40.

The day module 10 is inserted in the casing 40, is held there and is extracted therefrom in a manner identical to that described for the night module 1.

The day module 10 has the advantage of being less heavy than the night module 1.

The day module 10 is not supplied with electricity.

In another embodiment of the invention, the night module furthermore comprises the cathode-ray tube of the image generator 2 and its optical systems which ensure correct distortion. In addition to the substitute optical system, the associated day module comprises a cathode-ray tube for the image generator 2, the adjustment of which makes it possible to correct distortion by day; the day module also comprises electrical contacts which allow the said tube to operate.

The location in the helmet has dimensions tailored to the modules of this embodiment, which are larger and heavier than the modules of the embodiment described previously.

The assembly has the advantage of further lightening and of simplifying the optical device as a whole, as used by the wearer of the helmet for day vision, and without increasing the weight of the device as a whole for night vision.

What is claimed is:

1. A helmet vision system comprising:
   an image generator;
   an optical transmission system fixed to said helmet;
   a first interchangeable optical module configured for day vision; and
   a second interchangeable optical module configured for night vision,
   wherein said first interchangeable optical module and said second interchangeable optical module are configured to be interchangeably optically interconnected between said image generator and said optical transmission system.

2. The helmet vision system of claim 1, further comprising:
   a housing, said housing disposed between said image generator and said optical transmission system and configured to fixedly hold one of said first interchangeable optical module and said second interchangeable optical module.

3. The helmet vision system of claim 1, wherein said first interchangeable optical module further comprises an optical mixing system.

4. The helmet vision system of claim 2, wherein said first interchangeable optical module and said second interchangeable module further comprise at least one magnet configured to fixedly hold said first interchangeable optical module and said second interchangeable module in said housing.

5. The helmet vision system of claim 2, wherein said first interchangeable optical module and said second interchangeable module further comprise at least one centering pin configured to fixedly hold said first interchangeable optical module and said second interchangeable module in said housing.

6. The helmet vision system of claim 1, wherein said first interchangeable optical module further comprises an electrical contact.

7. The helmet vision system of claim 1, wherein said image generator is removable.

8. A helmet vision system comprising:
   means for generating an image;
   means for optical transmission fixed to said helmet;
   a first interchangeable optical means for day vision; and
   a second interchangeable optical means for night vision,
   wherein said first interchangeable optical means and said second interchangeable optical means are configured to be interchangeably optically interconnected between said means for generating an image and said means for optical transmission.

9. The helmet vision system of claim 8, further comprising:
   housing means for housing and fixedly holding one of said first interchangeable optical means and said second interchangeable optical means between said means for generating an image and said optical transmission means.

10. The helmet vision system of claim 8, wherein said first interchangeable optical means further comprises means for optical mixing.

11. The helmet vision system of claim 9, wherein said first interchangeable optical means and said second interchangeable means further comprise at least one means for magnetically fixedly holding said first interchangeable optical means and said second interchangeable means in said housing means.

12. The helmet vision system of claim 9, wherein said first interchangeable optical means and said second interchangeable means further comprise at least one means for centering and fixedly holding said first interchangeable optical means and said second interchangeable means in said housing means.

13. The helmet vision system of claim 8, wherein said first interchangeable optical means further comprises means for making an electrical contact.

14. The helmet vision system of claim 8, wherein said means for generating an image is removable.

* * * * *